US012614364B2

(12) United States Patent
Kang et al.

(10) Patent No.: US 12,614,364 B2
(45) Date of Patent: Apr. 28, 2026

(54) METHOD AND DEVICE FOR CREATING HEAD AVATAR USING SHOT VIDEO

(71) Applicant: KOREA INSTITUTE OF SCIENCE AND TECHNOLOGY, Seoul (KR)

(72) Inventors: Junseok Kang, Seoul (KR); Sangchul Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 171 days.

(21) Appl. No.: 18/441,528

(22) Filed: Feb. 14, 2024

(65) Prior Publication Data

US 2025/0124678 A1 Apr. 17, 2025

(30) Foreign Application Priority Data

Oct. 12, 2023 (KR) ........................ 10-2023-0135889

(51) Int. Cl.
*G06T 19/00* (2011.01)
*G06T 15/04* (2011.01)
*G06T 17/20* (2006.01)
*G06T 19/20* (2011.01)

(52) U.S. Cl.
CPC .............. *G06T 19/20* (2013.01); *G06T 15/04* (2013.01); *G06T 17/20* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 10,546,433 | B2 * | 1/2020 | Lin | ............................ G06T 7/62 |
| 10,559,111 | B2 * | 2/2020 | Sachs | ...................... G06F 18/23 |
| 11,961,266 | B2 * | 4/2024 | Zhang | ..................... G06T 13/40 |
| 2019/0156106 | A1 * | 5/2019 | Schroff | ................ G06V 40/161 |
| 2020/0327726 | A1 * | 10/2020 | Lin | ...................... G06V 10/774 |
| 2023/0237840 | A1 * | 7/2023 | Orvalho | ............... G06V 40/166 |
| | | | | 382/118 |
| 2024/0070987 | A1 * | 2/2024 | Li | ........................... G06T 13/40 |

* cited by examiner

*Primary Examiner* — Martin Mushambo
(74) *Attorney, Agent, or Firm* — NSIP Law

(57) ABSTRACT

According to a method and device for generating a head avatar using a shot video, a head mesh of neutral look and a head texture map of neutral look are generated based on a base mesh of a base model and at least one shooting image representing a face of neutral look among a plurality of shooting images generated from a camera shot video, and a head mesh reflecting a certain facial expression and a head texture reflecting the certain facial expression are generated based on at least one shooting image representing a face of a certain facial expression among the plurality of shooting images, the head mesh of neutral look, and the head texture map of neutral look.

18 Claims, 8 Drawing Sheets

1

METHOD AND DEVICE FOR CREATING HEAD AVATAR USING SHOT VIDEO

CROSS-REFERENCE TO RELATED APPLICATIONS

This application claims the benefit under 35 USC 119 (a) of Korean Patent Application No. 10-2023-0135889 filed on Oct. 12, 2023, in the Korean Intellectual Property Office, the entire disclosure of which is incorporated herein by reference for all purposes.

BACKGROUND

1. Field

The present disclosure relates to a method and device for creating a head avatar.

2. Description of the Related Art

Recently, with the development of virtual reality technology and the increase in demand for non-face-to-face services due to COVID-19, the need for personal avatars that may represent individuals in various fields has increased significantly. Accordingly, demand for avatar creation technology is also increasing significantly. However, conventional avatar creation technology requires creation experts or complex systems. Also, the avatars created by using conventional avatar creation technology have problems, such that great reduction in graphic precision or difficulty to modify avatars created by using such technology.

SUMMARY

The present provides head avatar creation method and device that may easily create a head avatar precisely representing an individual's face simply by shooting a face using a camera of a smartphone or so on while rotating around the face. The present disclosure is not limited to the technical objects described above, and other technical objects may be derived from the following description.

Additional aspects will be set forth in part in the description which follows and, in part, will be apparent from the description, or may be learned by practice of the presented embodiments of the disclosure.

According to an aspect of the present disclosure, a method of creating a head avatar includes inputting a shot video obtained by shooting a face of a shooting target using a camera and a base model that is a mesh model representing a shape of a head of a person, generating a plurality of shooting images representing a face of neutral look of the shooting target and a face of a certain facial expression of the shooting target from the input shot video, generating a head mesh of neutral look of the shooting target and a head texture map of neutral look of the shooting target based on the base mesh of the input base model and at least one shooting image representing the face of neutral look among the plurality of generated shooting images, and generating a head mesh reflecting the certain facial expression and a head texture reflecting the certain facial expression based on at least one shooting image representing a face of the certain facial expression among the plurality of generated shooting images, the generated head mesh of neutral look, and the generated head texture map of neutral look.

The generating of the head mesh of neutral look of the shooting target and the head texture map of neutral look of the shooting target may include performing learning on the face of neutral look of the shooting target by optimizing a neural implicit function (NIF) in a way that minimizes a difference between any one shooting image representing the face of neutral look and a rendering image that is an image rendered at a shooting position of the camera for the shooting target, and restoring the head mesh of neutral look of the shooting target using the optimized NIF.

In the performing of learning on the face of neutral look of the shooting target, the NIF and the head texture map may be optimized in a way that minimizes the difference between any one shooting image representing the face of neutral look and the rendering image, and the optimized head texture map may be generated as a head texture map of neutral look of the shooting target by optimizing the head texture map.

The performing of learning on the face of neutral look of the shooting target may include obtaining a warp field for each vertex of the base mesh by inputting coordinates of a plurality of vertices of the base mesh to the NIF, generating a head mesh by applying the warp field for each vertex of the obtained base mesh to each vertex of the base mesh, generating a rendering image, which is an image rendered at the shooting position of the camera for the shooting target, by performing neural rendering on the generated head mesh and the head texture map, calculating an image loss of the generated rendering image from a difference between the generated rendering image and any one shooting image representing the face of neutral look, and optimizing the NIF and the head texture map by backpropagating the calculated image loss.

The method may further include generating a plurality of subbase meshes, each of which is a mesh representing each part of the head, by dividing the base mesh for each part of the head, wherein the performing of the learning on the face of neutral look of the shooting target may further include calculating a regularization loss of the generated head mesh using the generated head mesh and the plurality of generated subbase meshes, and in the optimizing of the NIF and the head texture map, the NIF and the head texture map may be optimized by backpropagating the calculated regularization loss and the calculated image loss.

The restoring of the head mesh of neutral look of the shooting target may include obtaining a warp field for each vertex of the base mesh by inputting coordinates of a plurality of vertices of the base mesh to the optimized NIF, and restoring the head mesh of neutral look of the shooting target by applying the warp field for each vertex of the obtained base mesh to each vertex of the base mesh.

The generating of the head mesh reflecting the certain facial expression and the head texture reflecting the certain facial expression may include restoring a blend shape of the head mesh of neutral look from the generated head mesh of neutral look, the base mesh, and a blend shape of the base mesh, restoring the head mesh reflecting the certain facial expression from any one shooting image representing the face of the certain facial expression and the blend shape of the generated head mesh of neutral look, and restoring the head texture map reflecting the certain facial expression from any one shooting image representing the face of the certain facial expression and the head texture reflecting the certain facial expression.

The generating of the blend shape of the head mesh of neutral look may include calculating a blend shape offset of the base mesh by subtracting the base mesh from the blend shape of the base mesh, and generating a blend shape of the head mesh of neutral look by adding the calculated blend shape offset to the generated head mesh of neutral look.

The generating the head mesh reflecting the certain facial expression may include performing mesh learning on the face of the certain facial expression of the shooting target by optimizing a weight in a way that minimizes a difference between any one shooting image representing the face of the certain facial expression and the rendering image, which is an image rendered at the shooting position of the camera for the shooting target, and restoring the head mesh reflecting the certain facial expression by applying the optimized weight to the generated blend shape of the head mesh of neutral look.

The performing of the mesh learning on the face of the certain facial expression of the shooting target may include generating a head mesh by applying a weight to the generated blend shape of the head mesh of neutral look, generating a rendering image, which is an image rendered at the shooting position of the camera for the shooting target, by performing neural rendering on the generated head mesh and the generated head texture map of neutral look, calculating an image loss of the generated rendering image from a difference between the generated rendering image and any one shooting image representing the face of the certain facial expression, and optimizing the weights by backpropagating the calculated image loss.

In the restoring of the head mesh reflecting the certain facial expression, the head mesh reflecting the certain facial expression may be restored by multiplying each of meshes of the generated blend shape of the head mesh of neutral look by the optimized weight and combining the meshes multiplied by the weight.

The generating of the head texture reflecting the certain facial expression may include performing texture learning on the face of the certain facial expression of the shooting target by optimizing a neural implicit function (NIF) in a way that minimizes a difference between any one shooting image representing the face of the certain facial expression and a rendering image that is an image rendered at a shooting position of the camera for the shooting target, and restoring the head texture reflecting the certain facial expression from the generated head texture map of neutral look using the optimized NIF.

The performing of the texture learning on the face of the certain facial expression of the shooting target may include restoring a change amount of a head texture map according to a change in facial expression of the shooting target by inputting texture coordinates of the generated head texture map of neutral look and a latent code to the NIF, generating a head texture by adding the restored change amount of the restored head texture map to the generated head texture map of neutral look, generating a rendering image, which is an image rendered at the shooting position of the camera for the shooting target, by performing neural rendering on the restored head mesh reflecting the certain facial expression and the generated head texture, calculating an image loss of the generated rendering image from a difference between the generated rendering image and the shooting image of the certain facial expression among the plurality of generated shooting images, and optimizing the NIF and the latent code by backpropagating the calculated image loss.

The restoring of the head mesh reflecting the certain facial expression may include restoring the change amount of the head texture map according to the change in facial expression of the shooting target by inputting the texture coordinates of the generated head texture map of neutral look and the optimized latent code to the optimized NIF, and restoring the head texture reflecting the certain facial expression by adding the change amount of the head texture map to the generated head texture map of neutral look.

The method may further include modifying at least one of the generated head mesh of neutral look and the generated head texture map of neutral look according to information input from a user, and regenerating the head mesh reflecting the certain facial expression and the head texture reflecting the certain facial expression based on at least one shooting image representing the face of the certain facial expression, the modified head mesh of neutral look, and the modified head texture map of neutral look.

The method may further include modifying the generated head mesh reflecting the certain facial expression and the generated head texture map reflecting the certain facial expression according to information input from a user.

According to another aspect of the present disclosure, a computer-readable recording medium in which a program for causing a computer to perform the method of creating a head avatar is recorded.

According to another aspect of the present disclosure, an avatar creation device includes a data input unit configured to receive a shot video obtained by shooting a face of a shooting target using a camera and a base model that is a mesh model representing a shape of a head of a person, a preprocessor configured to generate a plurality of shooting images representing a face of neutral look of the shooting target and a face of a certain facial expression of the shooting target from the input shot video, a first head avatar creation unit configured to generate a head mesh of neutral look of the shooting target and a head texture map of neutral look of the shooting target based on at least one shooting image representing the face of neutral look among the plurality of generated shooting images and the base mesh of the input base model, and a second head avatar creation unit configured generate a head mesh reflecting the certain facial expression and a head texture reflecting the certain facial expression based on at least one shooting image representing a face of the certain facial expression among the plurality of generated shooting images, the generated head mesh of neutral look, and the generated head texture map of neutral look.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, embodiments of the present disclosure will be described in detail with reference to the accompanying drawings. Embodiments of the present disclosure relate to a head avatar creation method and a head avatar creation device that may easily create a head avatar that precisely represents an individual's face only by rotating around and shooting the face using a camera of a smartphone or so on. Hereinafter, the method and device will be briefly referred to as a "head avatar creation method" and a "head avatar creation device".

Figure 1:
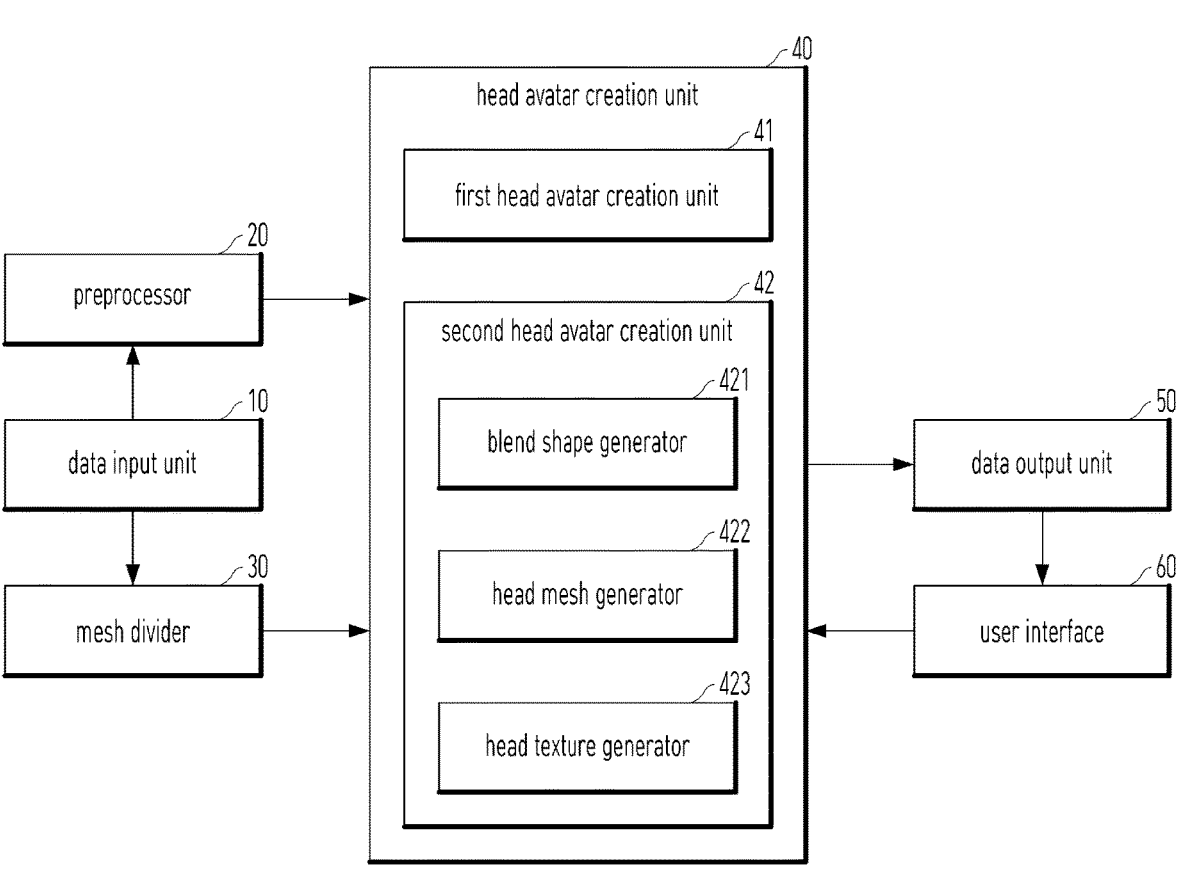
FIG. 1 is a configuration diagram of a head avatar creation device according to one embodiment of the present disclosure.

FIG. 1 is a configuration diagram of a head avatar creation device according to one embodiment of the present disclosure. Referring to FIG. 1, the head avatar creation device according to the present embodiment includes a data input unit 10, a preprocessor 20, a mesh divider 30, a head avatar creation unit 40, a data output unit 50, and a user interface 60. The data input unit 10, the preprocessor 20, the mesh divider 30, the head avatar creation unit 40, and the data output unit 50 may be implemented by a combination of a processor and a memory device. The user interface 60 may be implemented by a combination of a display panel, a touch screen panel, a keyboard, and a mouse.

Figure 2:
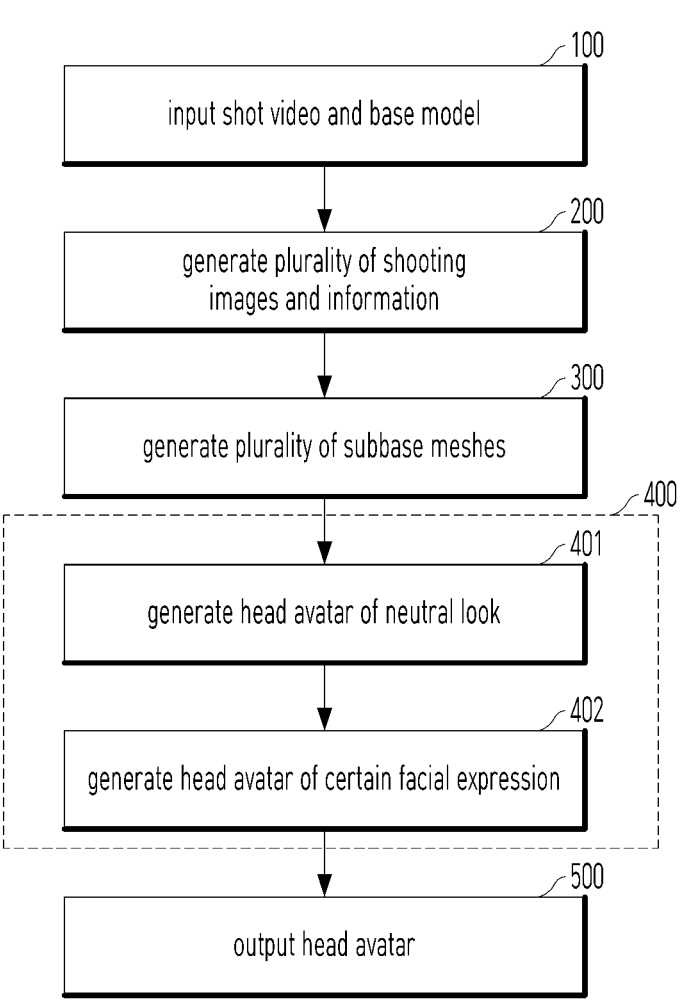
FIG. 2 is a flowchart of a method of creating a head avatar, according to one embodiment of the present disclosure.

FIG. 2 is a flowchart of a head avatar creation method according to one embodiment of the present disclosure. Referring to FIG. 2, the head avatar creation method according to the embodiment includes the following steps performed by the head avatar creation device illustrated in FIG. 1.

In step 100, the data input unit 10 shoots the face of various facial expressions of a person corresponding to a shooting target using a camera, such as a smartphone, and receives the shot video and a base model, which is a mesh model representing a shape of a person's head. The shot video input to the data input unit 10 may be obtained by shooting the face of a neutral look of a shooting target from various angles using a camera and by shooting the face of a certain facial expression of the shooting target from various angles.

The base model includes a base mesh representing a face of neutral look, and a blend shape of the base mesh. The blend shape of the base mesh is composed of meshes representing faces of various facial expressions modified from the mesh representing a face of neutral look. The base model may be obtained by downloading the base model through the Internet or generated based model itself.

In step 200, the preprocessor 20 extracts a plurality of shooting images from the shot video input to the data input unit 10 in step 100, and removes the background from each of the plurality of shooting images extracted in this manner, thereby generating a plurality of images from which the background is removed. The preprocessor 20 generates information on facial feature points for each of the plurality of shooting images representing a face of neutral look among the plurality of shooting images generated in this way, and generates camera parameter information indicating a shooting position of a camera on a shooting target.

The plurality of shooting images represent a face of neutral look or a certain facial expression of the shooting target. For example, a certain shooting image may be a face of neutral look image, and another shooting image may be a smiling or crying expression face image. In order to create a head avatar of neutral look that expresses the overall shape and texture of a three-dimensional (3D) head centered on the face, a plurality of shooting images representing the overall shape and texture of the head of a shooting target are required. Because a head avatar of a certain facial expression is created based on a previously created head avatar of neutral look, the head avatar of the certain facial expression may be created by only one shooting image representing the front of a face. As the number of shooting images used to create the head avatar of a certain facial expression increases, the similarity of the head avatar of a shooting target may improve.

In step 300, the mesh divider 30 divides a base mesh of a base model input to the data input unit 10 for each part of the head, thereby generating a plurality of subbase meshes which are mesh models representing parts of the head in step 100. Examples of parts of the head include the face, eyes, neck, hair, and so on.

In step 400, the head avatar creation unit 40 creates a head avatar based on the base mesh of the base model input to the data input unit 10 in step 100, the plurality of shooting images generated by the preprocessor 20 in step 200, the facial feature point information generated by the preprocessor in step 200, the camera parameter information generated by the preprocessor 20 in step 200, and the plurality of subbase meshes generated by the mesh divider 30 in step 300. The head avatar creation unit 40 includes a first head avatar creation unit 41 and a second head avatar creation unit 42.

In step 401, the first head avatar creation unit 41 generates a head mesh of neutral look of a shooting target and a head texture map of neutral look of the shooting target based on the base mesh of the base model input to the data input unit 10 in step 100, a plurality of shooting images showing a face of neutral look among the plurality of shooting images generated by the preprocessor 20 in step 200, the facial feature point information generated by the preprocessor in step 200, the camera parameter information generated by the preprocessor 20 in step 200, and the plurality of subbase meshes generated by the mesh divider 30 in step 300.

In step 402, the second head avatar creation unit 42 generates a head mesh that reflects a certain facial expression of at least one shooting image, a head texture that reflects the certain facial expression of the at least one shooting image, and a blend shape used to control the facial expression of the shooting target based on at least one shooting image representing a face of a certain facial expression among the plurality of shooting images generated by the preprocessor 20 in step 200, the camera parameter information generated by the preprocessor 20 in step 200, the head mesh of neutral look generated by the first head avatar creation unit 41 in step 401, and the head texture map of neutral look generated by the first head avatar creation unit 41 in step 401.

In step 500, the data output unit 50 outputs the head avatar created by the head avatar creation unit 40 in step 400 through the user interface 60. The head avatar output from the data output unit 50 includes a head mesh of neutral look, a head texture map of neutral look, a head mesh that reflects a certain facial expression of at least one shooting image, a head texture that reflects a certain facial expression of at least one shooting image, and a blend shape used to control the facial expression of a shooting target.

Figure 3:
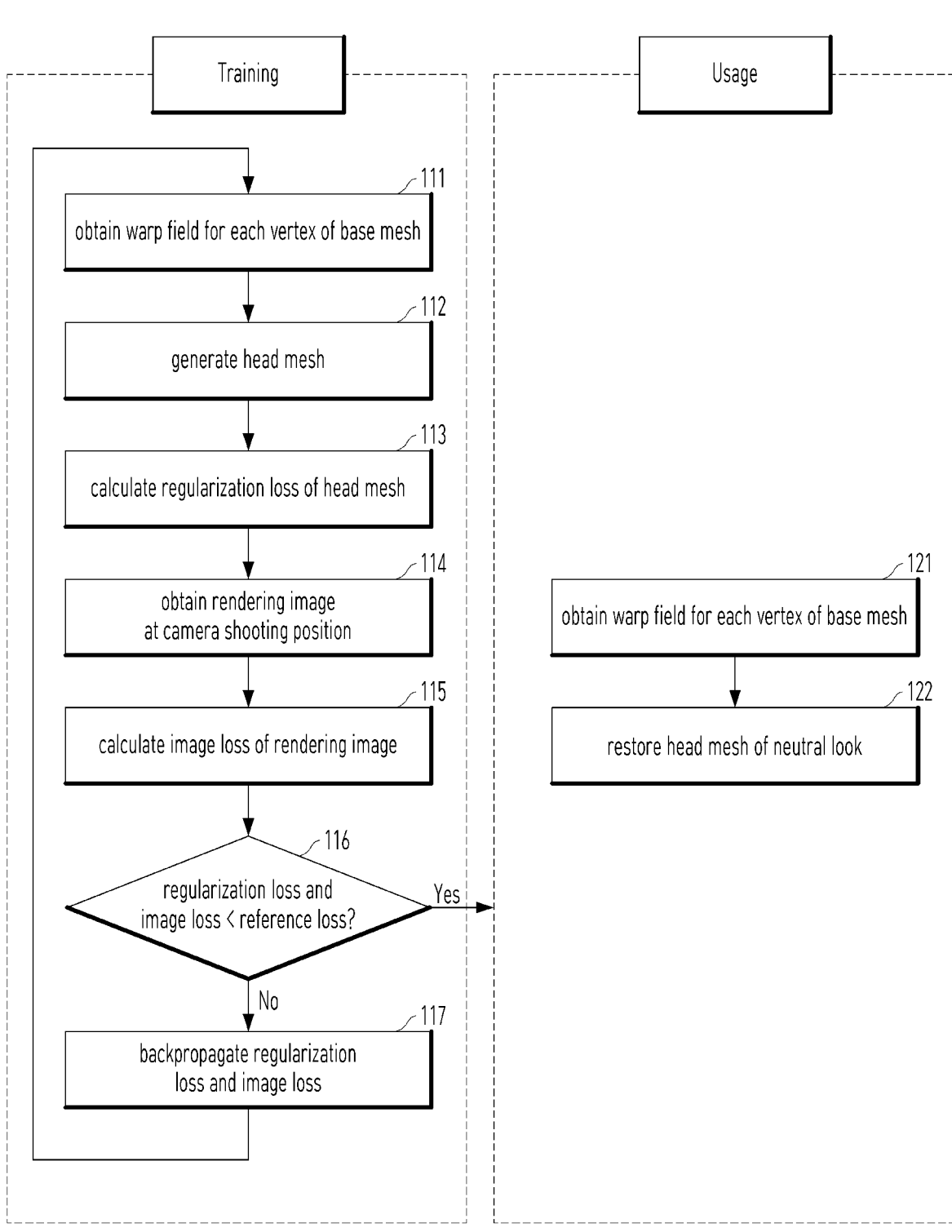
FIG. 3 is a detailed flowchart of step 401 illustrated in FIG. 2.

FIG. 3 is a detailed flowchart of step 401 illustrated in FIG. 2. Referring to FIG. 3, step 401 illustrated in FIG. 2 includes following steps. Step 111 to step 117 are steps in which the first head avatar creation unit 41 learns about the face of neutral look of a shooting target. In step 111 to step 117, the first head avatar creation unit 41 learns about the face of neutral look of the shooting target by optimizing a neural implicit function (NIF) and a head texture map in a way that minimizes a difference between any one shooting image representing a face of neutral look and a rendering image that is an image rendered at a shooting position of a camera on the shooting target. The first head avatar creation unit 41 may be implemented as a deep learning model.

In step 111, the first head avatar creation unit 41 obtains a warp field for each vertex of a base mesh by inputting a plurality of vertex coordinates of the base mesh to the NIF.

In step 112, the first head avatar creation unit 41 generates a head mesh by applying a warp field for each vertex of the base mesh obtained in step 111 to each vertex of the base mesh. In this way, when the warp field for each vertex of the base mesh obtained in step 111 is applied to each vertex of the base mesh, a new head mesh reflecting the warp field for each vertex of the base mesh is generated. As the number of repetitions of step 111 to step 117 increases, the head mesh generated in step 112 approximates any one shooting image representing a face of neutral look.

In step 113, the first head avatar creation unit 41 calculates a regularization loss of the head mesh generated in step 112 using the head mesh generated in step 112 and a plurality of sub-base meshes generated by the mesh divider 30 in step 300. The first head avatar creation unit 41 calculates the regularization loss of the head mesh generated in step 112 by calculating a relative Laplacian loss, a relative normal loss, an elastic loss, and a volume maximization loss of the head mesh generated in step 112 according to a following process. In addition to the losses described above, other types of losses may also be calculated as the regularization loss.

In step 114, the first head avatar creation unit 41 generates a rendering image that is an image rendered at a shooting position of a camera on a shooting target indicated by the camera parameter information generated by the preprocessor 20 in step 200 by performing neural rendering on the head mesh generated in step 112 and a head texture map. An initial state of the head texture map may be random noise or any texture map. The neural rendering may be performed by using software, such as nvdiffrast, soft rasterizer, kaolin, or so on.

In step 115, the first head avatar creation unit 41 calculates an image loss of the rendering image generated in step 114 a difference between the rendering image generated in step 114 and any one shooting image representing a face of neutral look among a plurality of shooting images generated by the preprocessor 20 in step 200. The first head avatar creation unit 41 calculates an image loss of the rendering image generated in step 114 by calculating a color loss, a perceptual loss, a silhouette loss, and a landmark loss of the rendering image generated in step 114 according to a following process. In addition to the losses described above, other types of losses may also be calculated the image loss.

In step 116, the first head avatar creation unit 41 compares the regularization loss calculated in step 113 with a preset reference loss for the regularization loss, and compares the image loss calculated in step 115 with a preset reference loss for the image loss. As a result of the comparison, when the regularization loss calculated in step 13 and the image loss calculated in step 115 are less than respective reference losses thereof, learning is completed. The learning may also be completed when a certain condition, such as the maximum number of learning times, is satisfied. Otherwise, the processing proceeds to step 117. In this way, step 111 to step 117 are repeatedly performed until the regularization loss calculated in step 113 and the image loss calculated in step 115 are less than the respective reference losses.

In step 117, the first head avatar creation unit 41 optimizes the NIF in step 111 and the head texture map of neutral look in step 114 by backpropagating the regularization loss calculated in step 113 and the image loss calculated in step 115. An optimization algorithm, such as Adam, may be used to optimize the NIF and head texture map. By optimizing the head texture map, the optimized head texture map is generated as a head texture map of neutral look of a shooting target. That is, the head texture map optimized in step 117 is the head texture map of neutral look generated by the first head avatar creation unit 41 in step 401.

When completing learning on any one shooting image representing a face of neutral look among a plurality of shooting images generated by the preprocessor 20, the NIF in step 111 and the head texture map of neutral look in step 114 are optimized as a facial expression represented by the shooting image. Step 111 to step 117 are repeatedly performed for other shooting images representing face of neutral looks. Step 111 to step 117 are repeatedly performed until learning is completed for all of the plurality of shooting images representing face of neutral looks. When completing learning for all of the plurality of shooting images representing face of neutral looks, the first head avatar creation unit 41 obtains information on a shape and texture of the entire three-dimensional head focusing on the face of neutral look.

Figure 4:
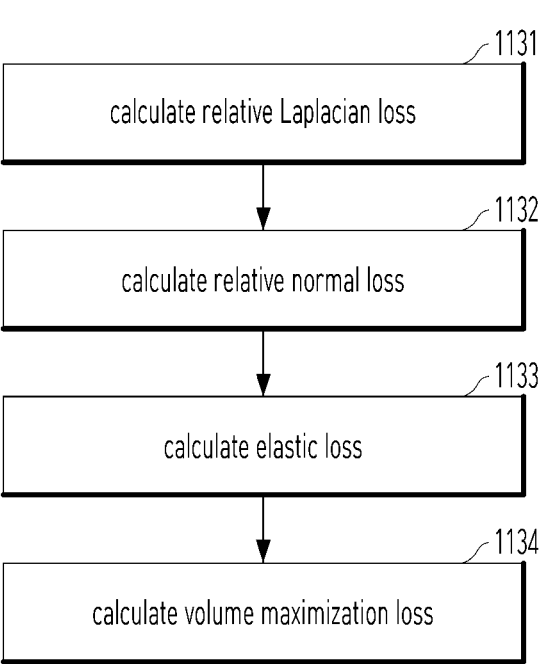
FIG. 4 is a detailed flowchart of step 113 illustrated in FIG. 3.

FIG. 4 is a detailed flowchart of step 113 illustrated in FIG. 3. Referring to FIG. 4, step 113 illustrated in FIG. 3 includes following steps.

In step 1131, the first head avatar creation unit 41 calculates the relative Laplacian loss between the head mesh generated in step 112 and the plurality of sub-base meshes generated by the mesh divider 30 in step 300 according to Equation 1 below. In Equation 1, "V" represents an index set of a vertex included in the head mesh. "$v'_i$" represents an i-th vertex coordinate of the head mesh generated in step 112, and "$v_i$" represents an i-th vertex coordinate of each sub-base mesh. "$v'_j$" represents a j-th vertex coordinate of the head mesh generated in step 112, and "$v_j$" represents a j-th vertex coordinate of each sub-base mesh. "$E_i$" represents the index set of neighbor vertices of vertex "$v_i$".

$$L_{lap} = \frac{1}{|V|} \sum_{i \in V} \left( v'_i - v_i - \frac{1}{|V|} \sum_{j \in E_i} \left( v'_j - v_j \right) \right) \qquad \text{Equation 1}$$

In step 1132, the first head avatar creation unit 41 calculates a relative normal loss between the head mesh generated in step 112 and the plurality of sub-base meshes generated by the mesh divider 30 in step 300 according to Equation 2 below. In Equation 2, "F" represents an index set of a face normal included in the head mesh. "$nf'_i$" represents an i-th face normal of the head mesh generated in step 112, and "$nf_i$" represents an i-th face normal of each sub-base mesh. "$nf'_j$" represents a j-th face normal of the head mesh generated in step 112, and "$nf_j$" represents a j-th face normal of each sub-base mesh.

$$L_{nrm} = \frac{1}{|F|} \sum_{i \in F} \left( n_{f_i} - n_{f'_i} \right) \qquad \text{Equation 2}$$

In step 1133, the first head avatar creation unit 41 calculates an elastic loss of the head mesh generated in step 112 using an elastic function rule according to Equation 3 below. The elastic loss calculated in this way represents the rigidity of the head mesh generated in step 112. In Equation 3, "$\rho$" represents a Geman-McClure robust error function. "$\Sigma$" is calculated according to Equation 4 below when "J" is the Jacobian of an NIF for an input vertex. "SVD" represents singular value decomposition.

$$L_{elastic} = \rho(\|\|\log\Sigma\|\|, 0.03) \qquad \text{Equation 3}$$

$$U, \Sigma, V^t = SVD(J) \qquad \text{Equation 4}$$

In step 1134, the first head avatar creation unit 41 calculates a volume maximization loss of the head mesh generated in step 112 according to Equation 5 to Equation 7 below. The head mesh generated in step 112 may be expressed in a three-dimensional (3D) coordinate system that is a kind of 3D mesh model. A volume "$V'_i$" between a triangular face with certain vertices i1, i2, and i3 as apexes and an origin point of the 3D coordinate system may be calculated according to Equation 5 below. $x_i$, $y_i$, and $z_i$ respectively mean an x-coordinate, a y-coordinate, and a z-coordinate of an i-th vertex. A volume "$V'_{total}$" of a mesh model obtained by using all faces may be calculated according to Equation 6 below. A maximum volume loss of the head mesh generated in step 112 may be calculated according to Equation 7 below.

$$V'_i = \frac{1}{6}(-x_{i3}y_{i2}z_{i1} + x_{i2}y_{i3}z_{i1} + x_{i3}y_{i1}z_{i2} - x_{i1}y_{i3}z_{i2} - x_{i2}y_{i1}z_{i3} + x_{i1}y_{i2}z_{i3}) \qquad \text{Equation 5}$$

$$V'_{total} = \sum_i V'_i \qquad \text{Equation 6}$$

$$L_{vol} = -V'_{total} \qquad \text{Equation 7}$$

Figure 5:
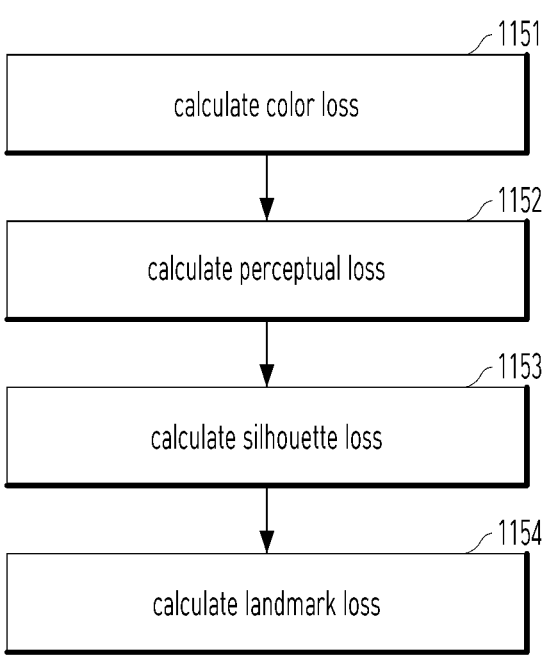
FIG. 5 is a detailed flowchart of step 115 illustrated in FIG. 3.

FIG. 5 is a detailed flowchart of step 115 illustrated in FIG. 3. Referring to FIG. 5, step 115 illustrated in FIG. 3 includes following steps.

In step 1151, the first head avatar creation unit 41 calculates a color loss according to Equation 8 below from a color difference between the rendering image generated in step 114 and any one image representing a face of neutral look among the plurality of shooting images generated by the preprocessor 20 in step 200. In Equation 8, "Rcolor" is an RGB color value of the rendering image generated in step 114, and "Icolor" is any one image representing a face of neutral look among the plurality of shooting images generated by the preprocessor 20 in step 200.

$$L_{color} = |I_{color} - R_{color}| \qquad \text{Equation 8}$$

In step 1152, the first head avatar creation unit 41 calculates a perceptual loss according to Equation 9 below from a difference in depth features between the rendering image generated in step 114 and any one image representing a face of neutral look among the plurality of shooting images generated by the preprocessor 20 in step 200. In Equation 9, "VGG" refers to a network having a visual geometry group (VGG) structure that outputs a previously learned feature map.

$$L_{perceptual} = \|VGG(I_{color}) - VGG(R_{color})\| \qquad \text{Equation 9}$$

In step 1153, the first head avatar creation unit 41 calculates a silhouette loss according to Equation 10 below from a silhouette difference between the rendering images generated in step 114 and any one image representing a face of neutral look among the plurality of shooting images generated by the preprocessor 20 in step 200. In Equation 10, "Rmask" represents a binary mask including only a foreground part extracted from the rendering image generated in step 114 except a background of the rendering image, and "Imask" represents a binary mask including only a foreground part extracted from any one image representing a face of neutral look among a plurality of shooting images except a background of the rendering image.

$$L_{mask} = \|I_{mask} - R_{mask}\| \qquad \text{Equation 10}$$

In step 1154, the first head avatar creation unit 41 calculates a landmark loss according to Equation 11 below from a landmark difference between the rendering image generated in step 114 and any one image representing a face of neutral look among the plurality of shooting images generated by the preprocessor 20 in step 200. In Equation 11, "$I_f$" and "$I_e$" respectively represent face landmarks and eye landmarks detected from each shooting image. In the present embodiment, pieces of information on facial feature points generated by the preprocessor 20 in step 200 is used as the face landmarks and the eye landmarks. "$v_f$" and "$v_e$" respectively represent face vertices and eye vertices of a base mesh. "P" represents a camera projection matrix, "R" represents global rotation, "t" represents global translation, and "s" represents a global scale.

$$L_{lmk} = \Sigma(\|l_f - P(sRv_f + t)\| + \|l_e - P(sRv_e + t)\|) \qquad \text{Equation 11}$$

Step 121 to step 122 are steps in which the first head avatar creation unit 41 restores a head mesh of neutral look of a shooting target after learning of the first head avatar creation unit 41 is completed. In step 121 and step 122, the first head avatar creation unit 41 restores the head mesh of neutral look of the shooting target using the optimized NIF in step 117.

In step 121, the first head avatar creation unit 41 obtains a warp field of each vertex of the base mesh by inputting coordinates of a plurality of vertices of the base mesh to the optimized NIF in step 116. In step 122, the first head avatar creation unit 41 restores the head mesh of neutral look of the shooting target by applying the warp field of each vertex of the base mesh obtained in step 121 to each vertex of the base mesh. By restoring the head mesh of neutral look, a head mesh of neutral look of a shooting target is generated.

Figure 6:
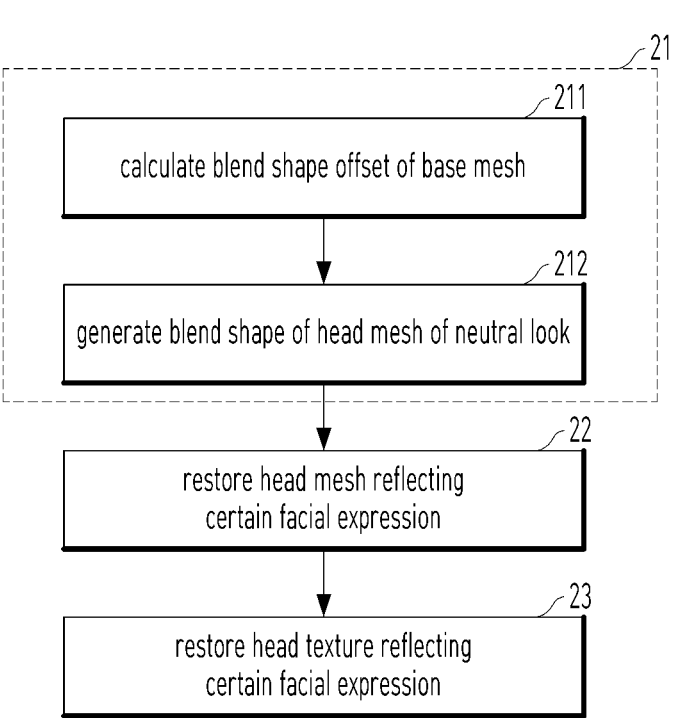
FIG. 6 is a detailed flowchart of step 402 illustrated in FIG. 2.

FIG. 6 is a detailed flowchart of step 402 illustrated in FIG. 2. Referring to FIG. 6, step 402 illustrated in FIG. 2 includes following steps. The second head avatar creation unit 42 includes a blend shape generator 421, a head mesh generator 422, and a head texture generator 423.

In step 21, the blend shape generator 421 generates a blend shape of a head mesh of neutral look from the head mesh of neutral look generated by the first head avatar creation unit 41 in step 401, a base mesh input to the data input unit 10 in step 100, and a blend shape of the base mesh. The blend shape of the head mesh of neutral look generated in step 21 is a blend shape used to control a facial expression of a shooting target generated by the second head avatar creation unit 42 in step 402.

In step 22, the head mesh generator 422 generates a head mesh, which reflects a certain facial expression of a shooting image, from any one shooting image of a certain facial expression among the plurality of shooting images generated by the preprocessor 20 in step 200 and the blend shape of the head mesh of neutral look generated by the blend shape generator 421 in step 21. The head mesh, which reflects the certain facial expression restored in step 22, is the head mesh that reflects the certain facial expression generated by the second head avatar creation unit 42 in step 402.

In step 23, the head texture generator 423 restores a head texture that reflects the certain facial expression of the shooting image from any one shooting image of a certain facial expression among the plurality of shooting images generated by the preprocessor 20 in step 200 and the head texture map of neutral look generated by the first head avatar creation unit 41 in step 401. The head texture that reflects the certain facial expression restored in step 23 is the head texture that reflects the certain facial expression generated by the second head avatar creation unit 42 in step 402.

Referring to FIG. 6, step 21 includes following steps. In step 211, the blend shape generator 421 calculates a blend shape offset of a base mesh of each mesh of blend shape by subtracting the base mesh input to the data input unit 10 in step 100 from each of the meshes of the blend shape of the base mesh input to the data input unit 10 in step 100. In step 212, the blend shape generator 421 generates a blend shape of the head mesh of neutral look by adding the blend shape offset calculated in step 211 to the head mesh of neutral look generated by the first head avatar creation unit 41 in step 401.

Figure 7:
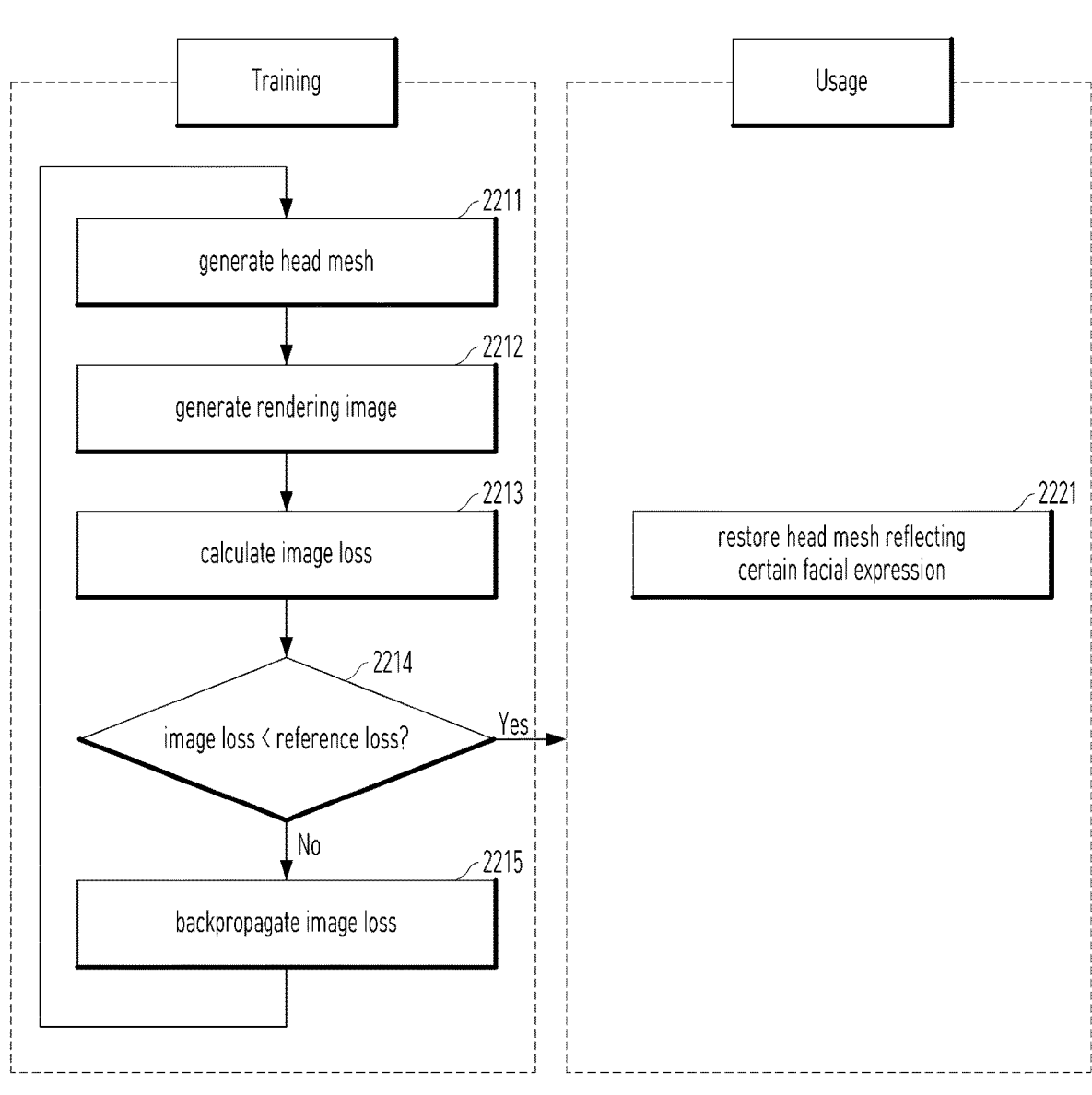
FIG. 7 is a detailed flowchart of step 22 illustrated in FIG. 6.

FIG. 7 is a detailed flowchart of step 22 illustrated in FIG. 6. Referring to FIG. 7, step 22 illustrated in FIG. 6 includes following steps. Step 2211 to step 2215 are steps in which the head mesh generator 422 performs mesh learning on a face of a certain facial expression of a shooting target. In step 2211 to step 2215, the head mesh generator 422 performs mesh learning on a face of a certain facial expression of a shooting target by optimizing a weight in a way that minimizes a difference between any one shooting image representing a face of a certain facial expression of a shooting target and a rendering image that is an image rendered at a shooting position of a camera on the shooting target. The head mesh generator 422 may be implemented by a deep learning model.

In step 2211, the head mesh generator 422 generates a head mesh by multiplying each of meshes of the blend shape of the head mesh of neutral look generated by the blend shape generator 421 in step 21 by a weight and combining the meshes multiplied by the weights. When the meshes multiplied by the weights are combined with each other, a new mesh that reflects the weights is generated. As the number of repetitions of step 2211 to step 2215 increases, the head mesh generated in step 2211 approximates any one shooting image representing a face of a certain facial expression.

In step 2212, the head mesh generator 422 generates a rendering image that is an image rendered at a shooting position of a camera on a shooting target indicated by the camera parameter information generated by the preprocessor 20 by performing neural rendering on the head mesh generated in step 2211 and the head texture map of neutral look generated by the first head avatar creation unit 41 in step 401.

In step 2213, the head mesh generator 422 calculates an image loss of the rendering image generated in step 2212 from a difference between the rendering image generated in step 2212 and any one shooting image representing a face of a certain facial expression among the plurality of shooting images generated by the preprocessor 20 in step 200. Like the first head avatar creation unit 41, the head mesh generator 422 calculates a color loss of the rendering image generated in step 2212 by calculating a color loss, a perceptual loss, a silhouette loss, and a landmark loss of the rendering image generated in step 2212. That is, step 1151 to step 1154 are applied to the rendering image generated in step 2212 and the shooting image of a certain facial expression among the plurality of shooting images generated by the preprocessor 20 in step 200.

In step 2214, the head mesh generator 422 compares the image loss calculated in step 2213 with a preset reference loss for an image loss. As a result of the comparison, when the image loss calculated in step 2213 is less than the preset reference loss, learning is completed. The learning may also be completed when certain conditions, such as the maximum number of learning times, are satisfied. Otherwise, the processing proceeds to step 2215. In this way, step 2211 to step 2215 are repeatedly performed until the image loss calculated in step 2213 is less than the preset reference loss.

In step 2215, the head mesh generator 422 optimizes the weight multiplied by the blend shape in step 2211 by backpropagating the image loss calculated in step 2213. An optimization algorithm, such as Adam, may be used to optimize such blend shape weights. When mesh learning on any one shooting image of a certain facial expression among the plurality of shooting images generated by the preprocessor 20 is completed, the weight multiplied by the blend shape in step 2211 is optimized to a facial expression illustrated by the shooting image. When there are a plurality of shooting images of a certain facial expression, step 2211 to step 2215 are repeatedly performed on the other shooting images representing faces of a certain facial expression.

Step 2221 is a step in which the head mesh generator 422 restores a head mesh that reflects a certain facial expression of a shooting target after the learning of the head mesh generator 422 is completed. In step 2221, the head mesh generator 422 restores a head mesh, which reflects a certain facial expression of at least one shooting image representing a face of a certain facial expression of a shooting target, by applying the weight optimized in step 2215 to the blend shape of the head mesh of neutral look generated by the blend shape generator 421 in step 21. That is, in step 2221, the head mesh generator 422 restores a head mesh, which reflects a certain facial expression of at least one shooting image representing a face of a certain facial expression of a shooting target, by multiplying each of the meshes of the blend shape of the head mesh of neutral look generated by the blend shape generator 421 in step 21 by the weight optimized in step 2215 and by combining the meshes multiplied by the weights in this way.

Figure 8:
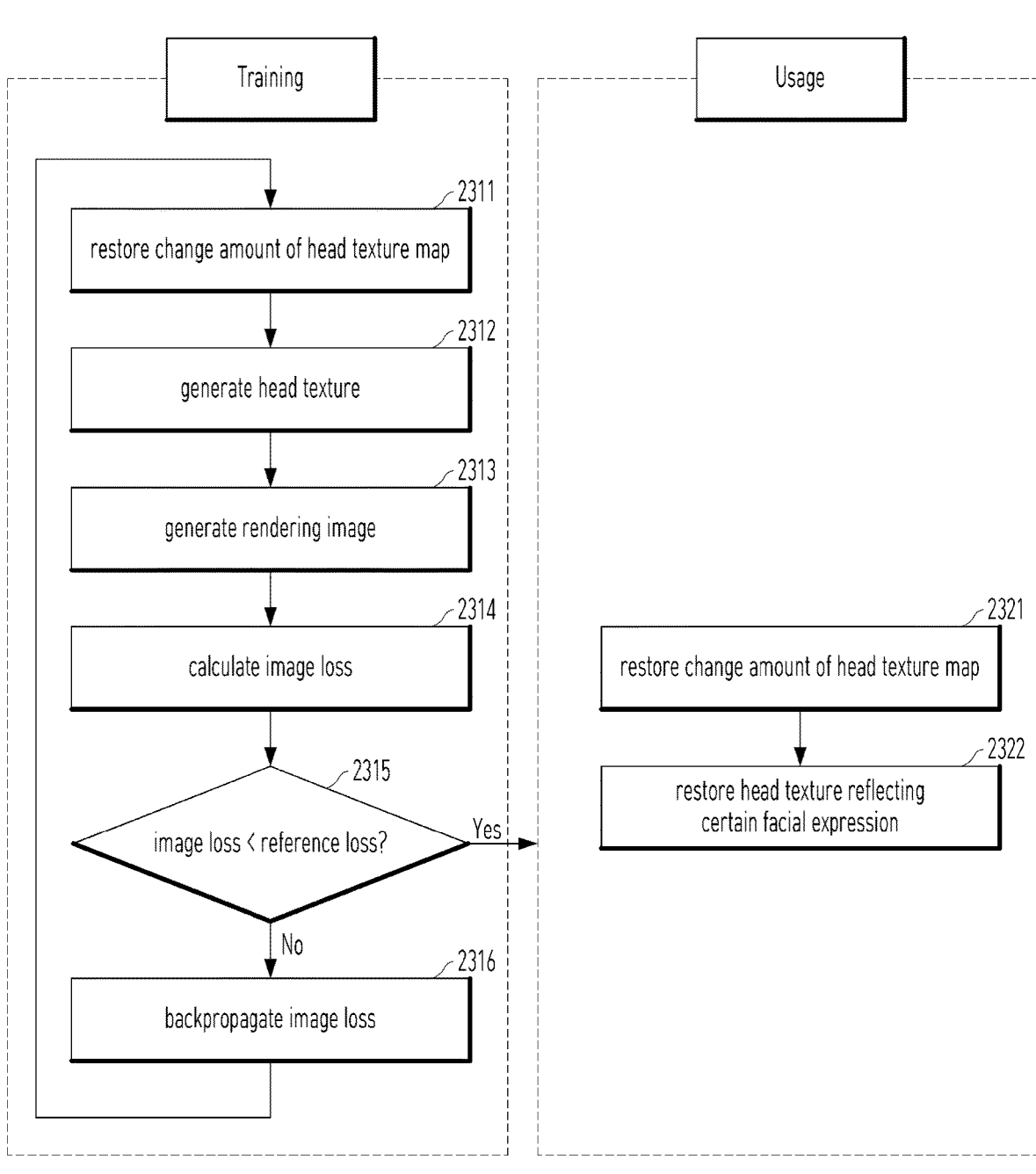
FIG. 8 is a detailed flowchart of step 23 illustrated in FIG. 6.

FIG. 8 is a detailed flow chart of step 23 illustrated in FIG. 6. Referring to FIG. 8, step 23 illustrated in FIG. 6 includes following steps. Step 2311 to step 2316 are steps in which the head texture generator 423 performs texture learning on a face of a certain facial expression of a shooting target. In step 2311 to step 2316, the head texture generator 423 performs texture learning on a face of a certain facial expression by optimizing an NIF in a way that minimizes a difference between any one shooting image representing a face of a certain facial expression of a shooting target and a rendering image that is an image rendered at a shooting position of a camera on the shooting target. The head texture generator 423 may be implemented by a deep learning model or another machine learning model.

In step 2311, the head texture generator 423 restores a change amount of a head texture map according to a change in facial expression of a shooting target by inputting a weight optimized by the head mesh generator 422 in step 2214, a texture coordinate of the head texture map of neutral look generated by the blend shape generator 421 in step 212, and a latent code to the NIF. The latent code is a random vector assigned to each shooting image for noise reduction and is optimized during a learning process of the head texture generator 423.

In step 2312, the head texture generator 423 generates a head texture, which reflects a change in facial expression of a shooting target, by adding the change amount of the head texture map restored in step 2311 to a head texture map of neutral look generated by the first head avatar creation unit 41 in step 401. In this way, when the change amount of the head texture map restored in step 2311 is added to the head texture map of a neutral look generated by the first head avatar creation unit 41 in step 401, a new head texture, which reflects the change amount of the head texture map, is generated. As the number of repetitions of step 2311 to step 2316 increases, the head texture generated in step 2312 approximates any one shooting image representing a face of a certain facial expression.

In step 2313, the head texture generator 423 generates a rendering image that is an image rendered at a shooting position of a camera on a shooting target indicated by the camera parameter information generated by the preprocessor 20 by performing neural rendering of a head mesh that reflects a certain facial expression and is restored by the head mesh generator 422 in step 22 and the head texture generated in step 2312.

In step 2314, the head texture generator 423 calculates an image loss of the rendering image generated in step 2313 from a difference between the rendering image generated in step 2313 and a shooting image of a certain facial expression among the plurality of shooting images generated by the preprocessor 20 in step 200. Like the first head avatar creation unit 41, the head mesh generator 422 calculates the image loss of the rendering image generated in step 2313 by calculating a color loss, a perceptual loss, a silhouette loss, and a landmark loss of the rendering image generated in step 2313. That is, step 1151 to step 1154 are applied to the rendering image generated in step 2313 and the shooting image of a certain facial expression among the plurality of shooting images generated by the preprocessor 20 in step 200.

In step 2315, the head texture generator 423 compares the image loss calculated in step 2314 with a preset reference loss for the image loss. As a result of the comparison, when the image loss calculated in step 2314 is less than the preset reference loss, learning is completed. Otherwise, the processing proceeds to step 2316. In this way, step 2311 to step 2316 are repeatedly performed until the image loss calculated in step 2314 is less than the preset reference loss.

In step 2316, the head texture generator 423 optimizes an NIF and a latent code in step 2311 by backpropagating the image loss calculated in step 2314. An optimization algorithm, such as Adam, may be used to optimize the NIF and latent code. When texture learning on any one shooting image of a certain facial expression among the plurality of shooting images generated by the preprocessor 20 is completed, the NIF and latent code in step 2311 are optimized to the facial expression illustrated by the shooting image.

When there are a plurality of shooting images of certain facial expressions, step 2311 to step 2316 are repeatedly performed on the other shooting images representing faces of certain facial expressions.

Step 2321 and step 2322 are steps in which the head texture generator 423 restores a head mesh that reflects a certain facial expression of a shooting target after learning of the head texture generator 423 is completed. In step 2221, the head texture generator 423 restores a head mesh, which reflects a certain facial expression of at least one shooting image, from the head texture map of a neutral look generated by the first head avatar creation unit 41 in step 401 using the NIF and latent code optimized in step 2316.

In step 2321, the head texture generator 423 restores the change amount of the head texture map according to the change in facial expression of the shooting target by inputting a weight optimized by the head mesh generator 422 in step 2215, a texture coordinate of the head texture map of neutral look generated by the head avatar creation unit 41 in step 401, and a latent code optimized in step 2316 to the NIF optimized in step 2316.

In step 2322, the head texture generator 423 restores a head texture, which reflects a certain facial expression of at least one shooting image representing a face of a certain facial expression of a shooting target, by adding the change amount of the head texture map restored in step 2321 to the head texture map of neutral look generated by the first head avatar creation unit 41 in step 401.

The first head avatar creation unit 41 may modify the head mesh of neutral look generated in step 401 and the head texture map of neutral look generated in step 401 according to the information input by a user through the user interface 60. In this case, the second head avatar creation unit 42 regenerates at least one shooting image representing a face of a certain facial expression among a plurality of shooting images generated by the preprocessor 20 in step 200, camera parameter information generated by the preprocessor 20 in step 200, a head mesh of neutral look modified according to user input information, a head mesh that reflects a certain facial expression of at least one shooting image based on a head texture map of neutral look modified according to the user input information, a head texture that reflects a certain facial expression of at least one shooting image, and a blend shape used to control a facial expressions of a shooting target.

The second head avatar creation unit 42 may modify the head mesh that reflects the certain facial expression generated in step 402, and the head texture map that reflects the certain facial expression generated in step 402, according to the information input by a user through the user interface 60. For example, a user may modify a head mesh using a mesh edit tool, and may modify a head texture map and a head texture using an image edit tool.

In addition, the method of generating the head avatar according to the embodiment of the present disclosure described above may be generated as a program executable by a processor of a computer, and may be implemented by a computer that records the program on a computer-readable recording medium and executes the program. The computer includes all types of computers that may execute programs, such as a desktop computer, a notebook computer, a smartphone, and an embedded-type computer. In addition, a structure of the data used in one embodiment of the present disclosure described above may be recorded on a computer-readable recording medium through various means. The computer-readable recording medium includes a storage, such as random access memory (RAM), read only memory (ROM), a solid state drive (SSD), a magnetic storage medium (for example, a floppy disk, a hard disk, or so on), or an optical reading medium (for example, compact disk (CD)-ROM, a digital video disk (DVD), or so on).

A head avatar, which accurately represents an individual's face, may be easily created only by obtaining a video by shooting a face by a camera of a smartphone or so on while rotating around the face, and inputting the shot video. In particular, by providing a head mesh of neutral look, a head texture map of neutral look, a head mesh that reflects a certain facial expression, a head texture that reflects a certain facial expression, and a blend shape used to control a facial expression of a shooting target as the head avatar creation result, animation using a head avatar may be easily made, and the head avatar may be easily modified. The present disclosure is not limited to the effects described above, and other effects may be derived from the descriptions.

Herein, preferred embodiments of the present disclosure are described. Those skilled in the art to which the present disclosure belongs will be able to understand that the present disclosure may be implemented in a modified form without departing from the essential characteristics of the present disclosure. Therefore, the disclosed embodiments should be considered from an illustrative point of view rather than a restrictive point of view. The scope of the present disclosure is represented in the claims rather than the above description, and all differences within the equivalent scope will be construed as being included in the present disclosure.

What is claimed is:

1. A method of creating a head avatar, the method comprising:
inputting a shot video obtained by shooting a face of a shooting target using a camera and a base model that is a mesh model representing a shape of a head of a person;
generating a plurality of shooting images representing a face of neutral look of the shooting target and a face of a certain facial expression of the shooting target from the input shot video;
generating a head mesh of neutral look of the shooting target and a head texture map of neutral look of the shooting target based on the base mesh of the input base model and at least one shooting image representing the face of neutral look among the plurality of generated shooting images; and
generating a head mesh reflecting the certain facial expression and a head texture reflecting the certain facial expression based on at least one shooting image representing a face of the certain facial expression among the plurality of generated shooting images, the generated head mesh of neutral look, and the generated head texture map of neutral look.

2. The method of claim 1, wherein the generating of the head mesh of neutral look of the shooting target and the head texture map of neutral look of the shooting target includes:
performing learning on the face of neutral look of the shooting target by optimizing a neural implicit function (NIF) in a way that minimizes a difference between any one shooting image representing the face of neutral look and a rendering image that is an image rendered at a shooting position of the camera for the shooting target; and
restoring the head mesh of neutral look of the shooting target using the optimized NIF.

3. The method of claim 2, wherein, in the performing of learning on the face of neutral look of the shooting target, the NIF and the head texture map are optimized in a way that minimizes the difference between any one shooting image representing the face of neutral look and the rendering image, and
the optimized head texture map is generated as a head texture map of neutral look of the shooting target by optimizing the head texture map.

4. The method of claim 3, wherein the performing of learning on the face of neutral look of the shooting target includes:
obtaining a warp field for each vertex of the base mesh by inputting coordinates of a plurality of vertices of the base mesh to the NIF;
generating a head mesh by applying the warp field for each vertex of the obtained base mesh to each vertex of the base mesh;
generating a rendering image, which is an image rendered at the shooting position of the camera for the shooting target, by performing neural rendering on the generated head mesh and the head texture map;
calculating an image loss of the generated rendering image from a difference between the generated rendering image and any one shooting image representing the face of neutral look; and
optimizing the NIF and the head texture map by backpropagating the calculated image loss.

5. The method of claim 4, further comprising:
generating a plurality of subbase meshes, each of which is a mesh representing each part of the head, by dividing the base mesh for each part of the head,
wherein the performing of the learning on the face of neutral look of the shooting target further includes calculating a regularization loss of the generated head mesh using the generated head mesh and the plurality of generated subbase meshes, and
in the optimizing of the NIF and the head texture map, the NIF and the head texture map are optimized by backpropagating the calculated regularization loss and the calculated image loss.

6. The method of claim 3, wherein the restoring of the head mesh of neutral look of the shooting target includes:
obtaining a warp field for each vertex of the base mesh by inputting coordinates of a plurality of vertices of the base mesh to the optimized NIF; and
restoring the head mesh of neutral look of the shooting target by applying the warp field for each vertex of the obtained base mesh to each vertex of the base mesh.

7. The method of claim 1, wherein the generating of the head mesh reflecting the certain facial expression and the head texture reflecting the certain facial expression includes:
restoring a blend shape of the head mesh of neutral look from the generated head mesh of neutral look, the base mesh, and a blend shape of the base mesh;
restoring the head mesh reflecting the certain facial expression from any one shooting image representing the face of the certain facial expression and the blend shape of the generated head mesh of neutral look; and
restoring the head texture map reflecting the certain facial expression from any one shooting image representing the face of the certain facial expression and the head texture reflecting the certain facial expression.

8. The method of claim 7, wherein the generating of the blend shape of the head mesh of neutral look includes:
calculating a blend shape offset of the base mesh by subtracting the base mesh from the blend shape of the base mesh; and generating a blend shape of the head mesh of neutral look by adding the calculated blend shape offset to the generated head mesh of neutral look.

9. The method of claim 7, wherein the generating the head mesh reflecting the certain facial expression includes:

performing mesh learning on the face of the certain facial expression of the shooting target by optimizing a weight in a way that minimizes a difference between any one shooting image representing the face of the certain facial expression and the rendering image, which is an image rendered at the shooting position of the camera for the shooting target; and restoring the head mesh reflecting the certain facial expression by applying the optimized weight to the generated blend shape of the head mesh of neutral look.

10. The method of claim 9, wherein the performing of the mesh learning on the face of the certain facial expression of the shooting target includes:

generating a head mesh by applying a weight to the generated blend shape of the head mesh of neutral look;

generating a rendering image, which is an image rendered at the shooting position of the camera for the shooting target, by performing neural rendering on the generated head mesh and the generated head texture map of neutral look;

calculating an image loss of the generated rendering image from a difference between the generated rendering image and any one shooting image representing the face of the certain facial expression; and optimizing the weight by backpropagating the calculated image loss.

11. The method of claim 10, wherein, in the restoring of the head mesh reflecting the certain facial expression, the head mesh reflecting the certain facial expression is restored by multiplying each of meshes of the generated blend shape of the head mesh of neutral look by the optimized weight and combining the meshes multiplied by the weight.

12. The method of claim 7, wherein the generating of the head texture reflecting the certain facial expression includes:

performing texture learning on the face of the certain facial expression of the shooting target by optimizing a neural implicit function (NIF) in a way that minimizes a difference between any one shooting image representing the face of the certain facial expression and a rendering image that is an image rendered at a shooting position of the camera for the shooting target; and restoring the head texture reflecting the certain facial expression from the generated head texture map of neutral look using the optimized NIF.

13. The method of claim 12, wherein the performing of the texture learning on the face of the certain facial expression of the shooting target includes:

restoring a change amount of a head texture map according to a change in facial expression of the shooting target by inputting texture coordinates of the generated head texture map of neutral look and a latent code to the NIF;

generating a head texture by adding the restored change amount of the restored head texture map to the generated head texture map of neutral look;

generating a rendering image, which is an image rendered at the shooting position of the camera for the shooting target, by performing neural rendering on the restored head mesh reflecting the certain facial expression and the generated head texture;

calculating an image loss of the generated rendering image from a difference between the generated rendering image and the shooting image of the certain facial expression among the plurality of generated shooting images; and optimizing the NIF and the latent code by backpropagating the calculated image loss.

14. The method of claim 13, wherein the restoring of the head mesh reflecting the certain facial expression includes:

restoring the change amount of the head texture map according to the change in facial expression of the shooting target by inputting the texture coordinates of the generated head texture map of neutral look and the optimized latent code to the optimized NIF; and restoring the head texture reflecting the certain facial expression by adding the change amount of the head texture map to the generated head texture map of neutral look.

15. The method of claim 1, further comprising:

modifying at least one of the generated head mesh of neutral look and the generated head texture map of neutral look according to information input from a user; and regenerating the head mesh reflecting the certain facial expression and the head texture reflecting the certain facial expression based on at least one shooting image representing the face of the certain facial expression, the modified head mesh of neutral look, and the modified head texture map of neutral look.

16. The method of claim 1, further comprising:

modifying the generated head mesh reflecting the certain facial expression and the generated head texture map reflecting the certain facial expression according to information input from a user.

17. A non-transitory computer readable storage medium in which a program for causing a computer to perform the method of claim 1 is recorded.

18. An avatar creation device comprising:

a data input unit configured to receive a shot video obtained by shooting a face of a shooting target using a camera and a base model that is a mesh model representing a shape of a head of a person;

a preprocessor configured to generate a plurality of shooting images representing a face of neutral look of the shooting target and a face of a certain facial expression of the shooting target from the input shot video;

a first head avatar creation unit configured to generate a head mesh of neutral look of the shooting target and a head texture map of neutral look of the shooting target based on at least one shooting image representing the face of neutral look among the plurality of generated shooting images and the base mesh of the input base model; and a second head avatar creation unit configured generate a head mesh reflecting the certain facial expression and a head texture reflecting the certain facial expression based on at least one shooting image representing a face of the certain facial expression among the plurality of generated shooting images, the generated head mesh of neutral look, and the generated head texture map of neutral look.

* * * * *